US011430343B2

(12) United States Patent
Briand et al.

(10) Patent No.: US 11,430,343 B2
(45) Date of Patent: Aug. 30, 2022

(54) AIRCRAFT MISSION COMPUTING SYSTEM COMPRISING A MISSION DECK

(71) Applicant: DASSAULT AVIATION, Paris (FR)

(72) Inventors: Benjamin Briand, Rueil Malmaison (FR); Cédric Carle, Andernos les Bains (FR); Stéphane Drinal, Paris (FR); Cyrille Grimald, Boulogne (FR); Jean-François Saez, Louveciennes (FR); Cyril Saint Requier, Montigny le Bretonneux (FR); Jean-Baptiste Vallart, Aix-en-Provence (FR)

(73) Assignee: DASSAULT AVIATION, Paris (FR)

( * ) Notice: Subject to any disclaimer, the term of this patent is extended or adjusted under 35 U.S.C. 154(b) by 937 days.

(21) Appl. No.: 16/199,045

(22) Filed: Nov. 23, 2018

(65) Prior Publication Data
US 2019/0164440 A1    May 30, 2019

(30) Foreign Application Priority Data
Nov. 24, 2017    (FR) .............................. FR 17 01234

(51) Int. Cl.
*G08G 5/00*    (2006.01)
*G01C 23/00*    (2006.01)
(Continued)

(52) U.S. Cl.
CPC ........... *G08G 5/0047* (2013.01); *G01C 23/00* (2013.01); *G06F 3/0488* (2013.01);
(Continued)

(58) Field of Classification Search
CPC .. G08G 5/0047; G08G 5/0013; G08G 5/0021; G08G 5/0034; G08G 5/0065;
(Continued)

(56) References Cited

U.S. PATENT DOCUMENTS

| 1,884,500 | A | * | 10/1932 | Anderson | ............ | G09B 29/102 |
| | | | | | | 340/286.14 |
| 4,599,070 | A | * | 7/1986 | Hladky | .................... | G09B 9/08 |
| | | | | | | 434/45 |

(Continued)

FOREIGN PATENT DOCUMENTS

| CA | 2559684 A1 | * | 3/2007 | ............ | H04W 4/024 |
| CA | 3025357 A1 | * | 5/2019 | ............ | G01C 23/00 |

(Continued)

OTHER PUBLICATIONS

"Automated Aircraft Trajectory Prediction Based on Formal Intent-Related Language Processing;" Juan A. Besada, Guillermo Frontera, Jesus Crespo, Enrique Casado, Javier Lopez-Leones ; IEEE Transactions on Intelligent Transportation Systems (vol. 14, Issue: 3, pp. 1067-1082); Sep. 1, 2013. (Year: 2013).*

(Continued)

*Primary Examiner* — Khoi H Tran
*Assistant Examiner* — Jorge O Peche
(74) *Attorney, Agent, or Firm* — Davidson, Davidson & Kappel, LLC

(57) ABSTRACT

An aircraft mission computing system includes an aircraft mission path computing engine, and a mission deck comprising a display and a display management assembly configured for displaying, on the display, at least one button for defining an operational specification of the mission. The computing engine is configured to be activated after defining the choice of operational specification using the definition button to determine at least one possible path of the aircraft based on the or each choice of defined operational specification using the or each definition button. The display management assembly is configured to display, on the display, after the activation of the computing engine, at least one outcome indicator providing mission feasibility infor- (Continued)

mation while respecting the or each operational specification choice.

19 Claims, 9 Drawing Sheets

(51) Int. Cl.
G06F 3/0488 (2022.01)
G06F 3/04847 (2022.01)
(52) U.S. Cl.
CPC ....... G06F 3/04847 (2013.01); G08G 5/0013 (2013.01); G08G 5/0021 (2013.01); G08G 5/0034 (2013.01); G08G 5/0065 (2013.01)
(58) Field of Classification Search
CPC ... G01C 23/00; G06F 3/04847; G06F 3/0488; G05D 1/101
See application file for complete search history.

(56) References Cited

U.S. PATENT DOCUMENTS

| | | | | |
|---|---|---|---|---|
| 7,343,229 B1* | 3/2008 | Wilson | ............. | G08G 5/0021 701/1 |
| 7,463,955 B1* | 12/2008 | Robinson | ............. | G08G 5/0021 340/963 |
| 7,471,995 B1* | 12/2008 | Robinson | ............. | G08G 5/0021 340/901 |
| 8,131,407 B1* | 3/2012 | Robinson | ............. | G01C 23/00 701/14 |
| 8,135,500 B1* | 3/2012 | Robinson | ............. | G08G 5/0021 701/14 |
| 9,703,476 B1* | 7/2017 | Pappas | ............. | G06F 3/04847 |
| 2006/0015254 A1* | 1/2006 | Smith | ............. | H04W 4/02 340/905 |
| 2008/0071434 A1* | 3/2008 | Fortier | ............. | G08G 5/0034 701/15 |
| 2008/0294335 A1* | 11/2008 | Bitar | ............. | G08G 5/0039 701/467 |
| 2009/0234519 A1* | 9/2009 | Hoofd | ............. | G08G 5/0039 701/4 |
| 2011/0231862 A1* | 9/2011 | Walsh | ............. | G06F 13/00 719/318 |
| 2012/0150369 A1* | 6/2012 | Giovannini | ............. | G05D 1/0676 701/18 |
| 2012/0245768 A1* | 9/2012 | De Cremoux | ............. | G05B 23/0272 701/3 |
| 2016/0041305 A1* | 2/2016 | Stulken | ............. | G08G 5/0021 340/977 |
| 2016/0078770 A1* | 3/2016 | Coulmeau | ............. | G08G 5/0039 701/3 |
| 2016/0085239 A1* | 3/2016 | Boyer | ............. | G08G 5/0021 701/5 |
| 2019/0164440 A1* | 5/2019 | Briand | ............. | G01C 23/00 |

FOREIGN PATENT DOCUMENTS

| | | | |
|---|---|---|---|
| EP | 2608187 A1 | | 6/2013 |
| JP | 2009251730 A | * | 10/2009 |
| JP | 2011226972 A | * | 11/2011 |
| WO | WO-2021152047 A1 | * | 8/2021 |
| WO | WO-2021152050 A1 | * | 8/2021 |

OTHER PUBLICATIONS

"Trajectory prediction credibility concept;" Petr Krupansky; Jiri Svoboda; Jan Kubalcik; 2009 IEEE/AIAA 28th Digital Avionics Systems Conference (pp. 3.B.1-1-3.B.1-13); Oct. 1, 2009. (Year: 2009).*
Search Report for priority application FR1701234.

* cited by examiner

AIRCRAFT MISSION COMPUTING SYSTEM COMPRISING A MISSION DECK

The present disclosure relates to an aircraft mission computing system comprising:
- an engine for computing paths of the aircraft during the mission, capable of computing a given path of the aircraft during the mission based on operational mission specifications.

Such a computing system is in particular intended to be integrated into an aircraft cockpit, in parallel with a flight management system (FMS), to allow the crew to determine mission paths.

Alternatively, the computing system is able to be integrated into an offboard mission planning system, for example into an aircraft path establishment airport infrastructure, and/or an electronic flight bag (EFB), optionally made up of a portable electronic device.

The preparation and definition of an aircraft mission between a first geographical point and a second geographical point is a time-consuming task. It in particular requires determining the route that the aircraft will follow, the associated flight profile, and the passenger, freight and fuel load. This definition is done based on a mission context including the weather, the airways to be followed, and an airplane context that includes the configuration and type of aircraft used, as well as its operating state.

BACKGROUND

In traditional civil aviation, the mission is relatively defined, since it generally consists of bringing passengers from a first geographical point to a second geographical point at a given time using known and repetitive commercial navigation routes.

Generally, airlines and/or outside suppliers have computing systems making it possible to provide a flight plan and expected aircraft performance, for example a required quantity of fuel.

Although changes may occur in the flight plan, they are generally minimal and often consist of shifting the schedule, for example to account for a slot change or weather difficulties.

In business aviation, the constraints weighing on the crew are greater. Clients sometimes require the crew to respect stricter mission criteria, for example regarding passenger comfort during the flight, the possibility of connecting to satellite transmission systems, available load, etc.

Furthermore, the mission conditions, in particular schedules, are highly variable, and the steps of the mission may change quickly based on passengers' specific needs.

SUMMARY OF THE INVENTION

In this context, the existing systems for providing flight plans are not fully satisfactory.

In particular, these systems are designed to operate on a sum of input criteria (speed, flight level, number of passengers, etc.) to which only one navigation solution will correspond. It is therefore frequently necessary to perform several iterations to adjust the mission hypotheses. Furthermore, these systems operate by following preestablished airways, which result from radionavigation.

These systems are based on the identification of an airway (ground track, i.e., the path of the airplane projected on the ground), then a vertical optimization of the path taking into account only the performance of the airplane (inherited from radionavigation). The route is therefore itself not optimized based on the mission context (constraint, criteria, weather, etc.).

In civil aviation, ground staff is often provided to lighten the burden of the crew and perform at least some of the preparation work.

However, in business aviation, the crew must often prepare the mission itself, taking into account the particular constraints of the passengers, and changes that may occur at any time during the mission.

One aim of the disclosure is therefore to provide an aircraft mission computing system that allows the crew to evaluate the mission feasibility easily, with a reduced workload, while taking account of operational mission specifications that are specific or that change during the mission.

To that end, a system of the aforementioned type is provided, characterized by:
- a mission deck comprising a display and a display management assembly capable of displaying, on the display, at least one button for defining an operational specification of the mission, the or each definition button being capable of being actuated by a user to define an operational specification of the mission from among a plurality of choices for the operational specification;
- the computing engine being able to be activated after defining the choice of operational specification using the definition button to determine at least one possible path of the aircraft based on the or each choice of operational specification defined by the user using the or each definition button;
- the display management assembly being able to display, on the display, after the activation of the computing engine, at least one outcome indicator providing mission feasibility information while respecting the or each operational specification choice defined by the user using the or each definition button.

The system according to the invention may comprise one or more of the following features, considered alone or according to any technically possible combination:
- the display management assembly is capable of simultaneously displaying, on the display, a plurality of respective buttons for defining a plurality of respective operational specifications, each definition button being capable of being actuated by a user to define a respective operational specification of the mission from among a plurality of choices for the respective operational specification;
- at least one operational specification includes a mission context;
- the mission context includes an operating constraint, in particular a maximum takeoff weight, a navigation fuel load, a reserve fuel load, an imposed takeoff time and/or arrival time, a maximum distance to be traveled;
- the mission context includes a navigation constraint, in particular a desired airspeed, a desired flight level, and/or an average wind;
- the mission context includes a passenger comfort constraint, in particular a desired turbulence level and/or a desired satellite coverage level;
- at least one outcome indicator is an indicator specific to a respective mission specification defined by the user using a given definition button, the specific indicator providing feasibility information on the mission while respecting the choice of the respective mission specification defined by the user using the given definition button;

the display management assembly is able to display the specific indicator on the given definition button;

at least one outcome indicator is an overall mission feasibility indicator taking account of each mission specification choice defined by the user using a definition button, the outcome indicator providing overall feasibility information for the mission;

the display management assembly is able to display at least one mission progress bar, the overall feasibility information being displayed on the progress bar;

the overall information identifies, on the progress bar, the or each segment of the mission in which the or each operational mission specification choice is impossible to respect;

the outcome indicator is able to present a first display configuration representative of a feasibility of the mission while respecting the or each operational specification choice defined by the user using the or each definition button and at least one second display configuration, representative of a non-feasibility of the mission while respecting the or each operational specification choice defined by the user using the or each definition button;

the display management assembly is able to display, on the display, at least one button for activation of the computing engine by a user, the activation button being configured to activate the computing engine in order to determine an alternative mission path not respecting at least one operational specification of the mission defined using the definition button;

the display management assembly is able to display at least one definition button in a position corresponding to an alternative choice of operational specification obtained by the computing module for the alternative path;

the display management assembly is able to display a button for applying the path and advantageously, an interface for sending information on the path to an air traffic control facility.

An aircraft mission computing method is also provided, comprising providing a computing system as cited above, the computing system carrying out the following steps:

displaying, on the display, at least one button for defining an operational specification of the mission, the or each definition button being capable of being actuated by a user to define an operational specification of the mission from among a plurality of choices for the operational specification;

after defining the choice of operational specification using the or each definition button by a user, activating the computing engine to determine at least one possible path of the aircraft based on the or each choice of operational specification defined by the user; then displaying, on the display, by the display management assembly, at least one outcome indicator providing mission feasibility information while respecting the or each operational specification choice defined by the user using the or each definition button.

BRIEF SUMMARY OF THE DRAWINGS

The invention will be better understood upon reading the following description, provided solely as an example and done in reference to the appended drawings, in which.

DETAILED DESCRIPTION

Figure 1:
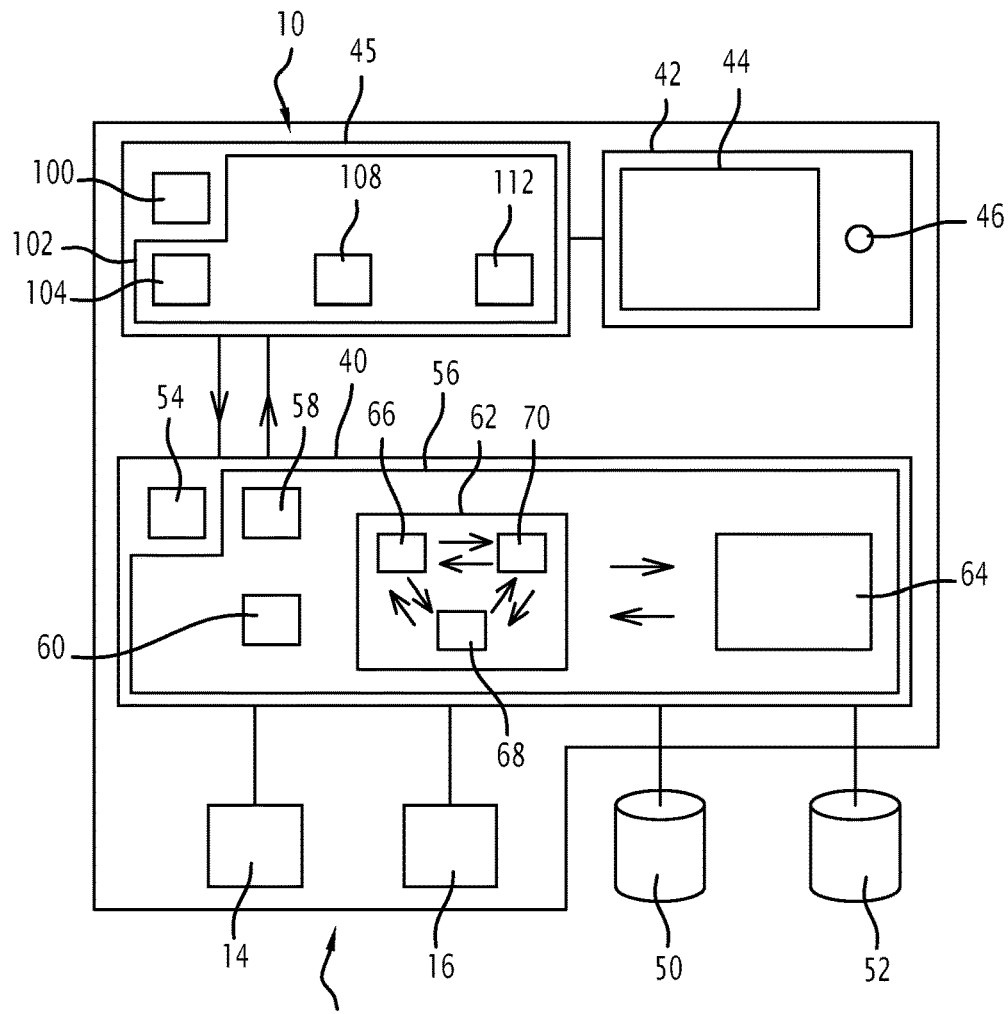
FIG. 1 is a block diagram illustrating a first mission computing system according to an embodiment of the invention, integrated into a cockpit of an aircraft.

A first mission computing system 10 according to an embodiment of the invention, present in the cockpit 12 of an aircraft, is illustrated by FIG. 1.

The aircraft is preferably a civilian aircraft, preferably a business plane.

In a known manner, the cockpit 12 of the aircraft is intended to control all of the systems of the aircraft during its use.

The cockpit 12 in particular includes, aside from the mission computing system 10, a flight management system (FMS) 14 and a system 16 for managing and monitoring the various airplane systems.

The flight management system 14 is intended to aid the pilot of the aircraft in navigating the aircraft during a mission. It is able to provide information in particular on the route followed by the aircraft, and the evolution parameters of the aircraft, such as the fuel consumption.

Figure 3:
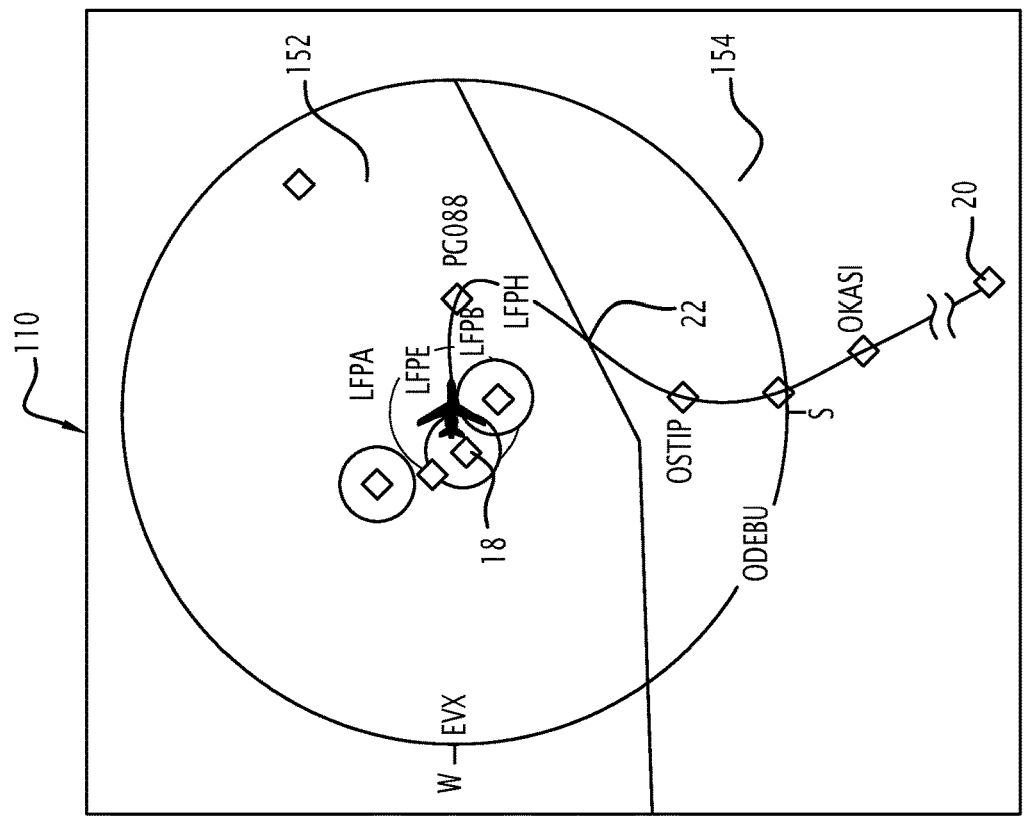
FIG. 3 is a schematic illustration of a display window of a mission deck of the system according to an embodiment of the invention, during the definition of operational mission specifications by the crew.
Figure 3:
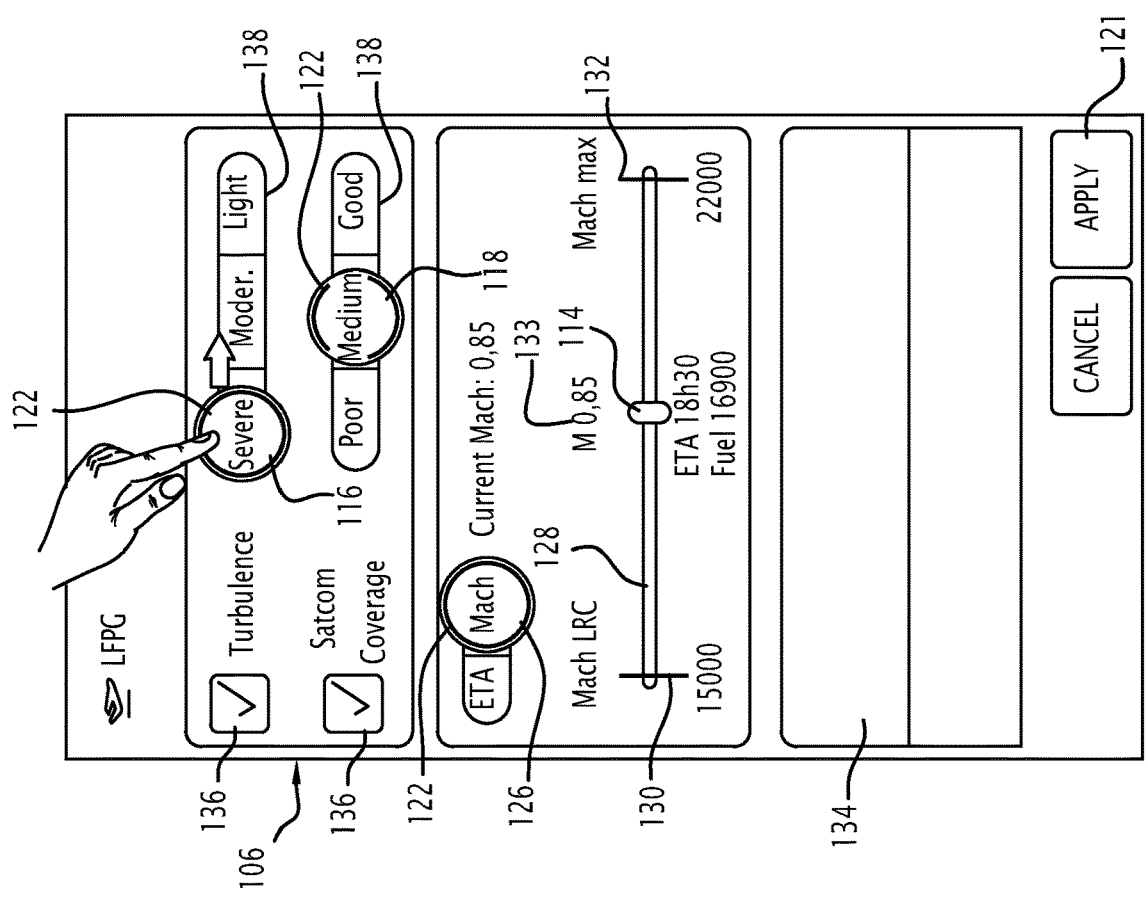
Figure 4:
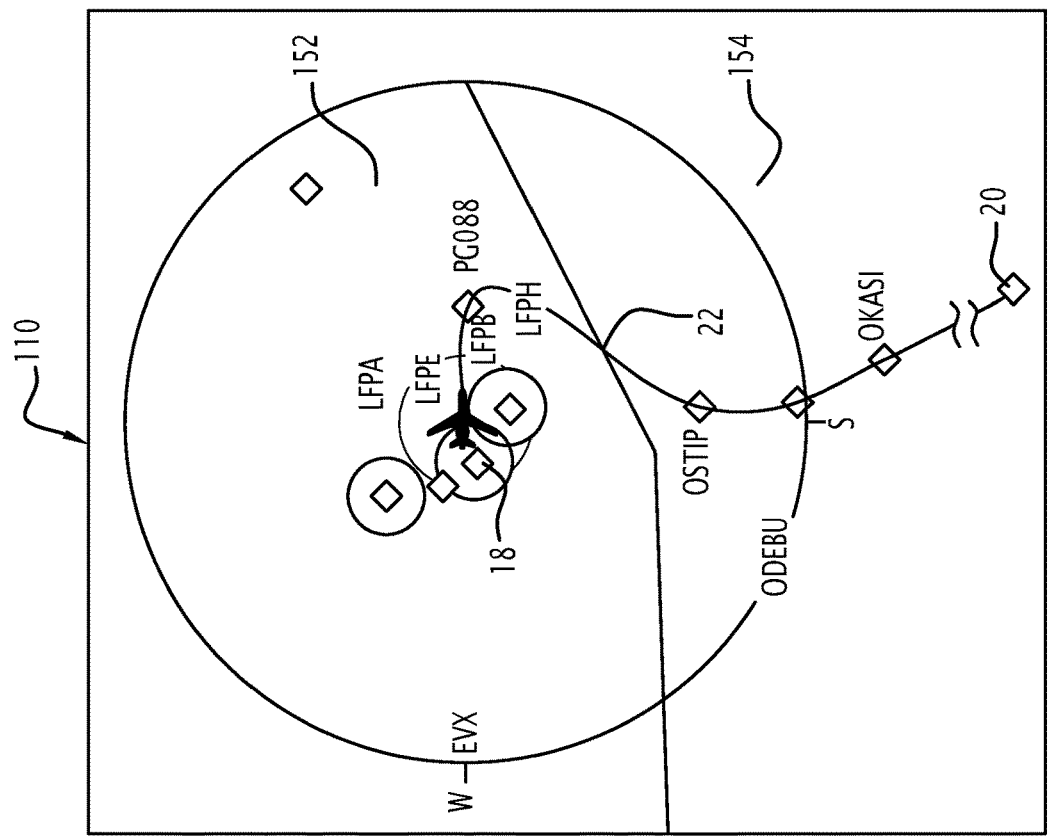
FIG. 4 is a view similar to FIG. 3, after modification of a choice of operational specifications.
Figure 4:
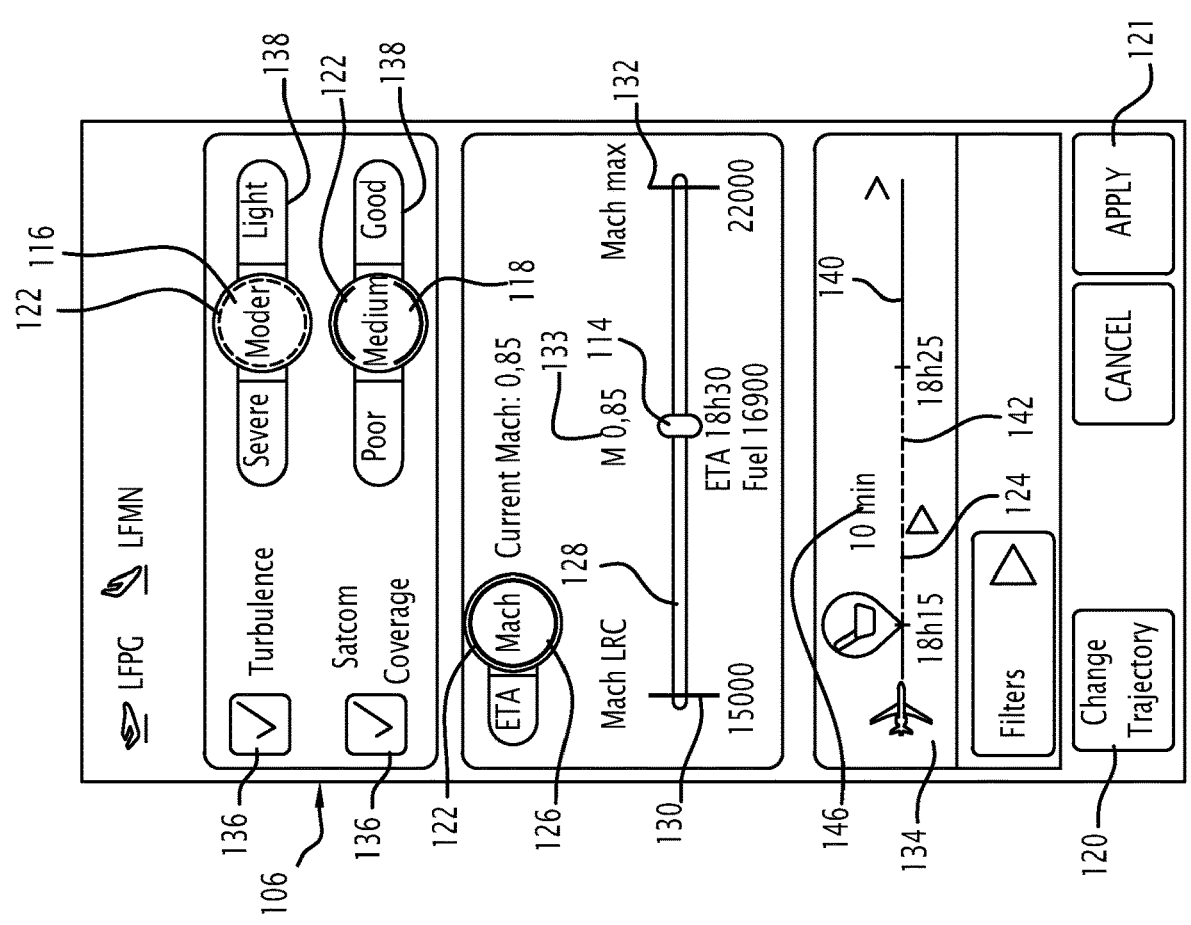

It is also able to guide the aircraft to cause it to follow a preset path between a first geographical point of origin 18 and a second destination geographical point 20 (shown schematically in FIGS. 3 and 4).

The system 16 for managing and monitoring the various airplane systems is in particular intended to allow the crew to monitor and optionally control all of the aircraft systems. It is in particular capable of determining an operating state of the aircraft, in particular in the presence of flaws and failures present on the aircraft on the ground and/or in flight.

As will be seen below, the mission computing system 10 according to an embodiment of the invention is connected to the system 16 for taking the state of the airplane into account in mission computations.

The mission carried out by the aircraft includes at least one step 22 (or leg) between a first geographical point 18 of origin and a second destination geographical point 20 (see FIG. 3). In some cases, the mission performed by the aircraft includes a plurality of successive legs 22, the second geographical destination point 20 of a first leg constituting the first geographical point of origin 18 of a second leg.

The mission is carried out by following operational specifications that in particular comprise a mission context and an airplane context.

The mission context for example includes at least one operating constraint, in particular a number of passengers to be carried, a maximum weight at takeoff in particular related to an available runway length, a navigation fuel load, a reserve fuel load, an imposed takeoff time and/or arrival time, a maximum distance to be traveled and/or a distance to an alternative terrain en route.

Figure 2:
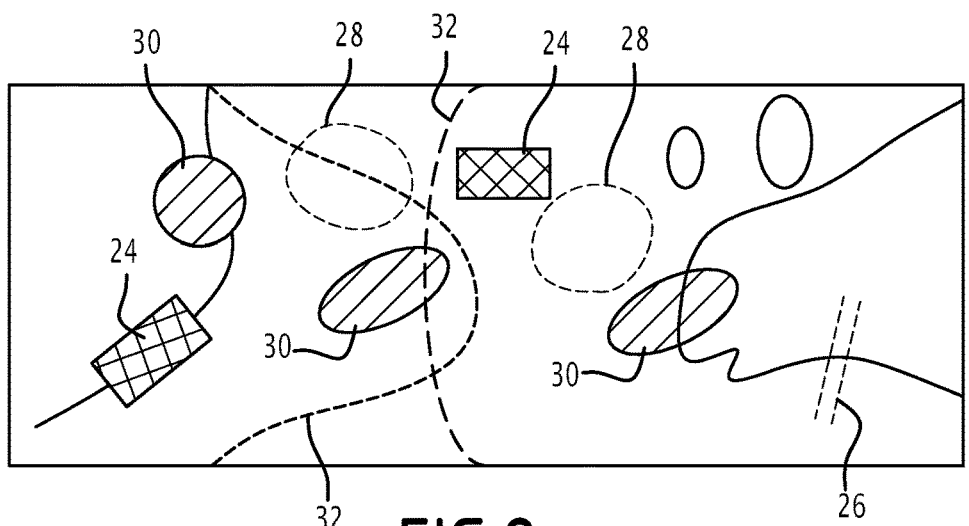
FIG. 2 is a schematic view of a navigation zone of the aircraft in which there are turbulent regions, regions not meeting the comfort criteria of the mission and satellite telecommunications coverage regions.

In reference to FIG. 2, the mission context advantageously comprises navigation constraints, for example prohibited zones 24 or flight levels, imposed airways 26 or flight levels, or more globally free flight zones and/or flight zones imposed by the airways.

The mission context advantageously comprises weather constraints such as ice formation or weather avoidance zones 28 (cumulonimbus, for example).

The mission context optionally comprises passenger comfort constraints, in particular turbulence zones 30 to be avoided, in particular based on the desired turbulence level, for example chosen from a low level, a medium level, and a high level of turbulence, or satellite telecommunications coverage zones 32 in order to allow telecommunications between the aircraft and the outside world in particular on the ground, in particular chosen from among a low level, a medium level and a good level of communication possibilities.

The airplane context may comprise usage constraints related to dispatches and/or constraints related to a particular state of the aircraft in terms of defects and/or failures on one or several pieces of equipment of the aircraft.

For example, a dispatch related to certain defects of the aircraft may impose a maximum flight level and/or a maximum speed. A failure to retract the landing gear or a flap may also impose an increased fuel consumption constraint.

The mission computing system 10 is intended to establish a path of the aircraft to perform step 22 between at least a first geographical point of origin 18 and at least one second destination geographical point 20, taking account of the operational specifications, and in particular the mission context and the airplane context.

The path obtained using the mission computing system 10 includes the route of the aircraft in latitude and longitude, as well as the altitude speed profile.

Advantageously, the mission computing system 10 is further capable of establishing flight plan parameters, in particular the weight and balance of the aircraft, the takeoff and landing target (i.e., the flight data for the pilot relative to guiding such as the speeds V1, V2, VR on the runway, the acceleration upon releasing the brakes, the engine speed upon takeoff, and/or the attitude upon takeoff) as well as the computation of the limit weights on takeoff and landing, the weather at low speed (i.e., on the surface) and high speed (i.e., en route), the air traffic control information ("Automated Terminal Information Service" ATIS, "Notice to airmen" e-NOTAM, "Flight Information RegionS" FIRS, air traffic control broadcasting services), and/or available alternative terrains at destination, and along the way.

In reference to FIG. 1, the mission computing system 10 comprises a computing engine 40 and a user interface 42 for configuring and outcome forming a mission deck.

The user interface 42 for example comprises at least one display 44, an assembly 45 for generating a display on the display 44 and at least one member 46 for selecting and entering information by the user, which can be a real or virtual keyboard, a mouse and/or a touch-sensitive system.

The user interface 42 is able to allow the user to enter at least some of the operational specifications, in particular the geographical origin and destination points 18, 20, waypoints, desired times, desired loads, a maximum wind on the path, etc.

The user interface 42 is advantageously able to allow the user to define at least a portion of the mission context, in particular the navigation and passenger comfort constraints, and/or to define at least a portion of the airplane context.

The computing engine 40 is connected to the interface 42. It is advantageously also connected to the flight management system 14, to the management and monitoring system 16.

It is able to query a weather database 50 and/or a navigation information database 52, for example via a data network, in particular a wireless data network.

The weather database 50 contains current and predictive weather information in the navigation zone of the aircraft between the point of origin 18 and the destination point 20.

This weather data is provided on several flight altitude levels, for example every 304 m (1000 feet), at an altitude for example between 0 m and 15,545 m (51,000 feet).

The weather data is provided in terms of altitude, but also "around the flight plan" to provide a weather component evolving over time.

This weather data in particular includes the speed and direction of the wind, temperature, pressure, precipitation, dangerous phenomena (ice, storms/cumulonimbus), turbulence, tropopause level, volcanic ash clouds, dust/sand clouds, visibility, as well as aeronautic observations over the zone or route (METAR, TAF, PIREPS), etc. It optionally includes the definition and evolution over time and space of the geographical coordinates of ice formation or weather avoidance zones 28 and/or turbulence zones 30.

The navigation information database 52 contains informational data on terrain at the point of origin 18 and the destination point 20, and between these points 18, 20. The navigation information database 52 advantageously comprises a navigation sub-database (waypoints, routes, etc.) and an airport sub-database (runway lengths, runway orientations, flight path angles, etc.).

Advantageously contains the definition of the geographical coordinates of prohibited zones and/or flight levels 24, in particular due to geopolitical data, and/or imposed airways 26.

It optionally comprises the definition of satellite telecommunications coverage zones 32.

The computing engine 40 comprises at least one computer including at least a processor 54 and a memory 56. The memory 56 contains software modules capable of being executed by the processor 54.

In particular, the memory 56 contains a software module 58 for initializing mission specifications, capable of acquiring operational specifications of the mission in particular from the interface 42, and a software module 60 for recovering weather data from the database 50.

The memory 56 further contains a software module 62 for determining airplane performance, as a function of mission specifications and weather data, and a software module 64 for computing an airplane path, as a function of the determined airplane performance, weather data and mission specifications.

The initialization module 58 is capable of acquiring the operational specifications of the mission from the interface 42, and/or advantageously from the flight management system 14 and/or the management and monitoring system 16.

The recovery module 60 is capable of querying the weather database 50 in particular to obtain the speeds and directions of the wind between the point of origin 18 and the destination point 20, at several flight levels.

The determining module 62 comprises a software application 66 for determining the weight and balance of the aircraft, intended to determine the center of gravity of the aircraft, a software application 68 for determining high-speed performance, and advantageously a software application 70 for determining low-speed performance.

The application 66 for determining the weight and balance of the aircraft is capable of determining the position of the center of gravity of the aircraft with no fuel in the aircraft (or Zero Fuel Weight Center of Gravity) and the weight of the aircraft with no fuel in the aircraft (or Zero Fuel Weight), based on the empty weight of the aircraft, equipment on board the aircraft, passengers and/or freight on board, and in their position in the aircraft, as well as monitoring of the flight envelope of the aircraft (weight—centering diagram).

The application for determining high-speed performance 68 is capable of determining the weight of fuel to be placed on board the aircraft on a given path, for example an orthodromic path between the point of origin 18 and the destination point 20, using the position of the center of gravity and the weight of the aircraft with no fuel in the aircraft (or Zero Fuel Weight) determined by the application 66, a preset airspeed, for example entered or computed from data entered by the user interface 42, weather data recovered from the module 60, in particular wind speeds and temperatures, and optionally the airplane context, for example the type and age of the engines, recovered from the initialization module 58.

The application for determining low-speed performance 70 is capable of determining in particular the maximum weight of the aircraft (and the takeoff target) allowing the aircraft to take off and/or land on terrain, based on runway length data recovered from the database 52, and weather data recovered from the module 60.

The computing module 64 is capable of computing at least one path 22 between the point of origin 18 and the destination point 20.

In one embodiment, the computing module 64 is configured to compute at least one iso-movement curve of the aircraft, in particular at least one isochronous curve and/or at least one fuel iso-consumption curve, from at least one point of the path, and to determine the position of at least one other point of the path on the iso-movement curve of the aircraft.

Such an operating mode is described in U.S. Pat. No. 10,867,521.

Alternatively, the computing module 64 is a commercial computing module supplied by a service provider such as ARINC DIRECT or MyGDC and/or a computing module specific to a land-based flight planning unit in an airport facility for establishing aircraft trajectories.

Alternatively, during a mission execution, the computing module 64 is a path computing module integrated into the flight management system 14 of the cockpit of the aircraft.

In the example shown in FIG. 1, the display 44 is for example a screen present in the cockpit of the aircraft, in particular a screen present across from at least one of the seats of the cockpit of the aircraft.

The display generating assembly 45 comprises at least a processor 100 and a memory 102 containing at least one software module capable of being executed by the processor to create a display on the display 44.

Figure 8:
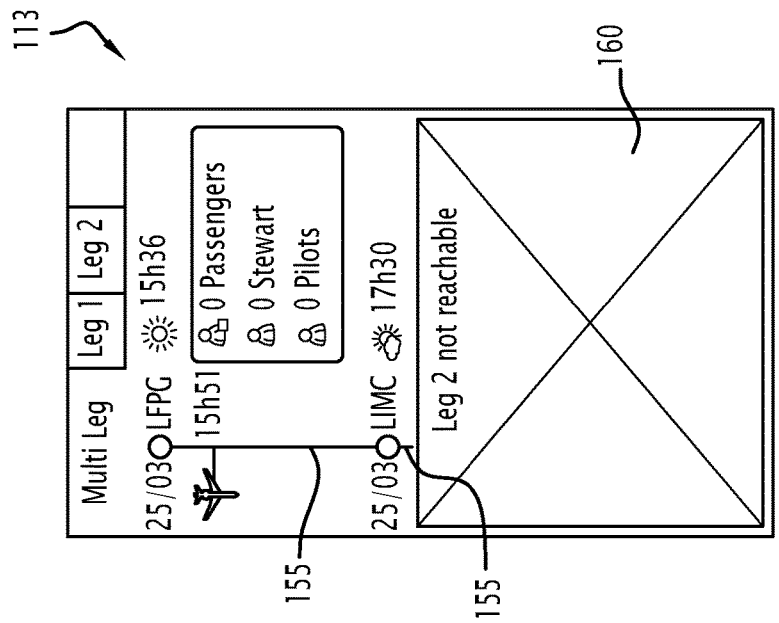
FIG. 8 is a view of a navigation window illustrating the non-feasibility of a particular segment of the mission.

In the example shown in FIG. 1, the memory 102 contains at least one software module 104 for displaying a window 106 for defining operational specifications and retrieving feasibility information for the mission (see FIG. 3). The memory 102 advantageously contains a software module 108 for displaying a path window 110 (see FIG. 3), and optionally, a module 112 for displaying a window 113 summarizing successive points on the path, an example of which is illustrated in FIG. 8.

The display generating assembly 45 is thus configured to display the defining and outcome window 106 on the display 44.

In the example illustrated by FIG. 3, the window 106 comprises buttons 114, 116, 118 for defining the choice of operational specifications for the mission.

Figure 7:
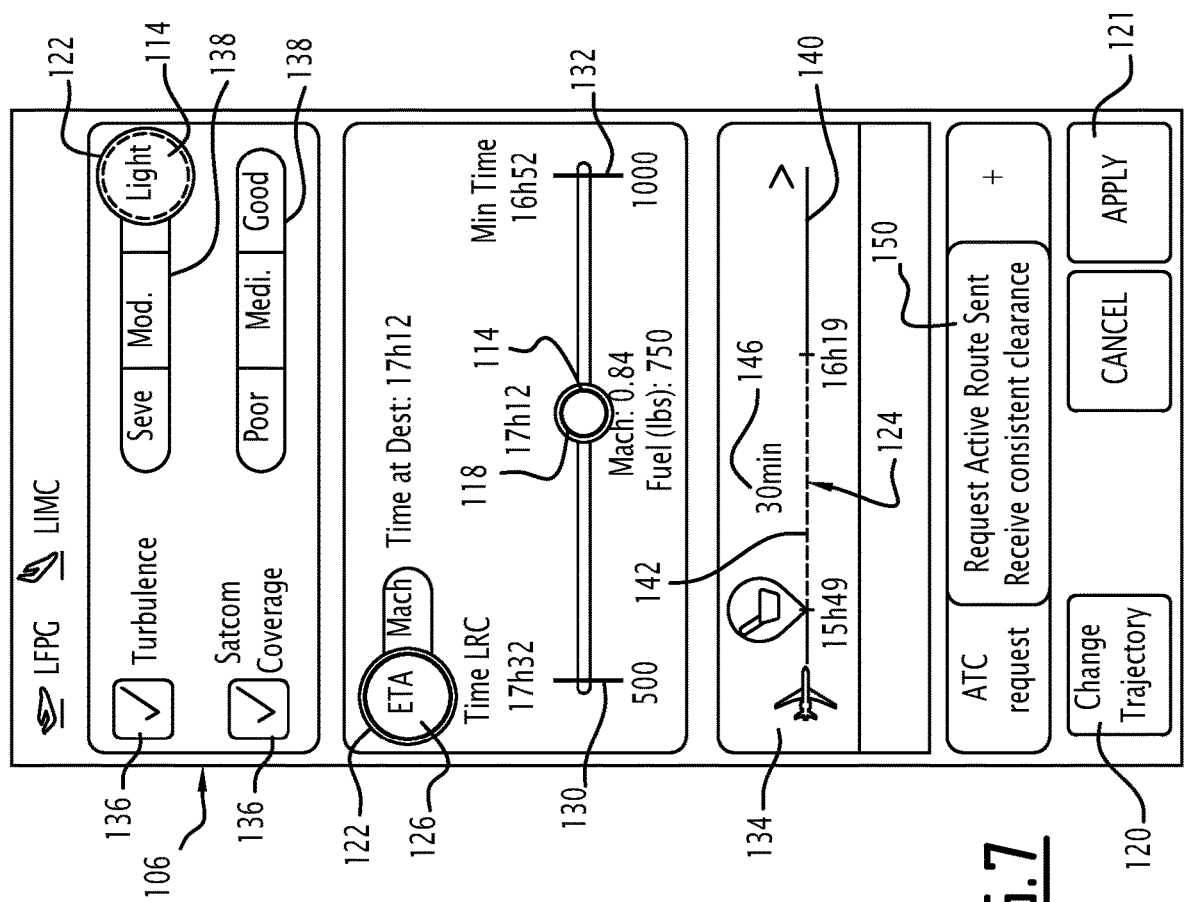
FIG. 7 is a view similar to FIG. 6, illustrating a outcome box showing a mission feasibility outcome indicator.

In reference to FIG. 7, the window 106 further advantageously comprises a button for activating 120 the computing engine 40 in order to determine at least one possible alternative path for the aircraft based on choices of operational specifications defined using the buttons 114, 116, 118.

The window 106 further optionally comprises a button 121 for applying a path.

The window 106 further comprises outcome indicators 122, 124 (the indicator 124 being visible in FIG. 7), providing at least one piece of feasibility information of the mission while complying with the choices of operational specifications defined using the buttons 114, 116, 118.

Among the definition buttons 114, 116, 118, a first definition button 114 is intended to be actuated by a user to define a choice of a navigation constraint from among a desired airspeed (here defined by a Mach number) or a desired time of arrival RTA.

The window 106 to that end comprises a button 126 for selecting the desired navigation constraint from among the desired airspeed and the desired time of arrival.

The selection button 126 is capable of being moved by the user to choose the type of navigation constraint defined by the first button 114.

The first button 114 is placed movably on a constraint selection scale 128, allowing the user to define a choice of constraint value between a minimum value, taken at a first end 130 of the scale 128, and a maximum value, taken at a second end 132 of the scale 128, based on the position of the first button 114 on the constraint selection scale 128.

In this example, the constraint selection scale 128 extends horizontally.

Indicators 133 simultaneously display, near the button 114, the selected constraint value, here the selected airspeed and/or the selected time of arrival in the current position of the button 114, and optionally other information such as the fuel mass necessary to achieve this constraint.

The second button 116 and/or the third button 118 here are capable of being actuated by the user in order to select the passenger comfort constraint choices.

The window 106 advantageously comprises, for each button 116, 118, a box 136 for activating the definition of the constraint choice.

It comprises, for each button 116, 118, a constraint selection scale 138, making it possible to define discrete constraint choices from among a set of possible constraints, by moving the button 116, 118 on the constraint selection scale 138.

In this example, the constraint selection scales 138 extend horizontally.

For example, the button 116 is intended to define a turbulence constraint selection from among a severe constraint ("Severe"), a moderate constraint ("Moder") and a light constraint ("Light").

The button 118 is intended to define a satellite coverage constraint selection from among a light coverage constraint ("Poor"), a medium coverage constraint ("Medium"), and a good coverage constraint ("Good").

The activation box 136 is able to be selected by the user to go from a configuration of application of the operational specification to a configuration of non application of the operational specification.

After each change of the position of a button 114 to 118, or an activation box 136, the computing engine 40 is able to activate the initialization module 58 to acquire the choices of operational specifications defined by the respective positions of the buttons 114 to 118 and/or by each activation box 136. Then, the computing engine 40 is able to activate the recovery module 60, the determining module 62 and the computing module 64 to determine at least one path respecting the defined choices of operational specifications.

The computing engine 40 is able to be configured by the user in order to define, by zones, the parameters for computing the path between a path proposal making it possible to modify the vertical path, with or without lateral modification. The lateral modifications can be authorized through the following actions: free flight, direct flight to a waypoint with possibility of lateral modification ("direct to"+"offset lateral") or respect for airways.

If no path respecting the defined choices of operational specifications is obtained, the computing engine 40 is able to be activated by the button 121 to modify at least one choice of operational specification, then to activate the recovery module 60, the determining module 62, and the computing module 64 again in order to determine at least one alternative path in which at least one choice of defined operational specification is not respected.

The computing engine 40 is able to be configured by the user in order to define, by zones, the parameters for computing the alternative path between an identical path proposal, a proposal making it possible to modify the vertical path, with or without lateral modification. The lateral modifications can be authorized through the following actions: free flight, direct flight to a waypoint with possibility of lateral modification ("direct to"+"offset lateral") or respect for airways.

Several alternative paths can be proposed by the computing engine 40. In this case, the display management assembly 45 is able to display, in the defining and outcome window 106, a scroll bar 137 (see FIG. 5) allowing the user to successively display the various path proposals, and the outcome indicators 122, 124 associated with each of the proposals.

Figure 5:
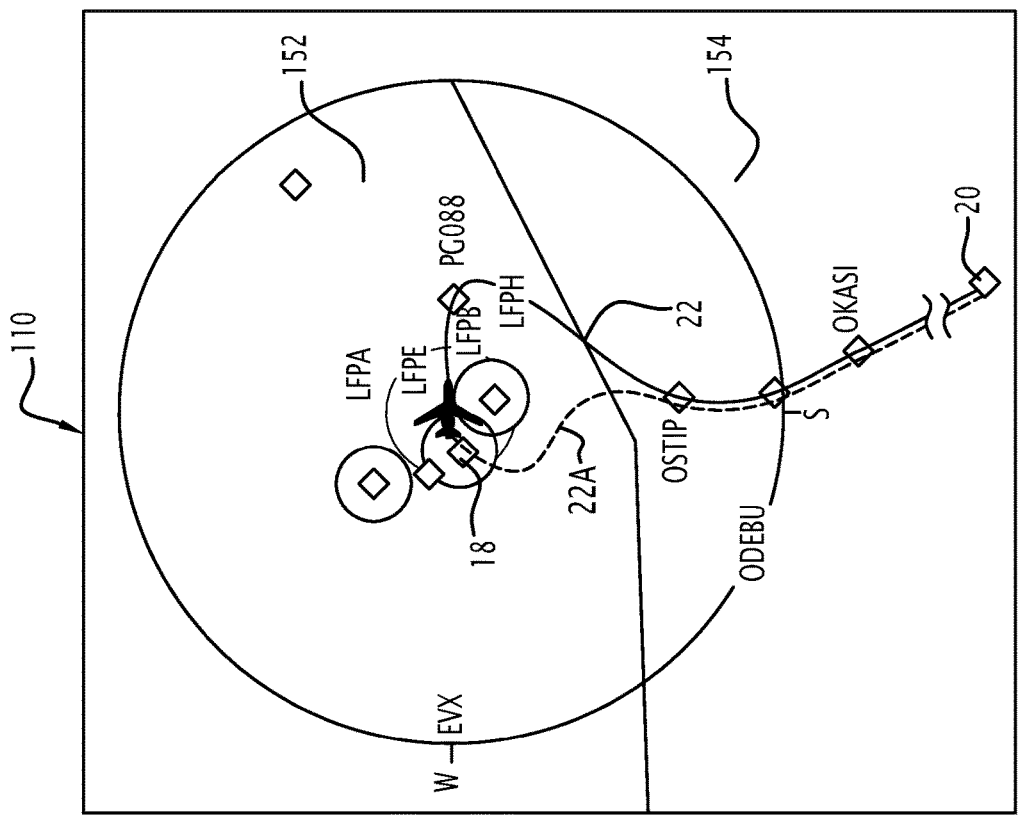
FIG. 5 is a view similar to FIG. 3, wherein the system proposes an alternative route.
Figure 5:
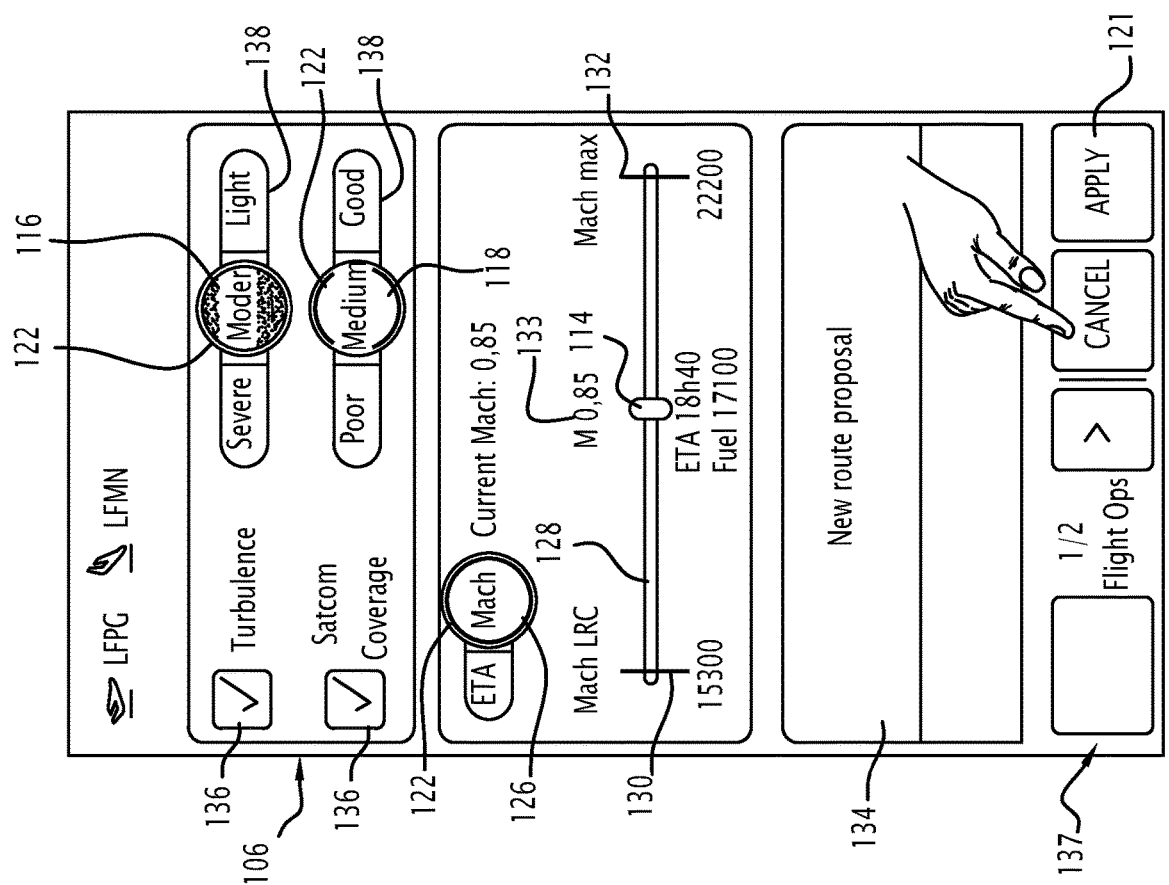
Figure 6:
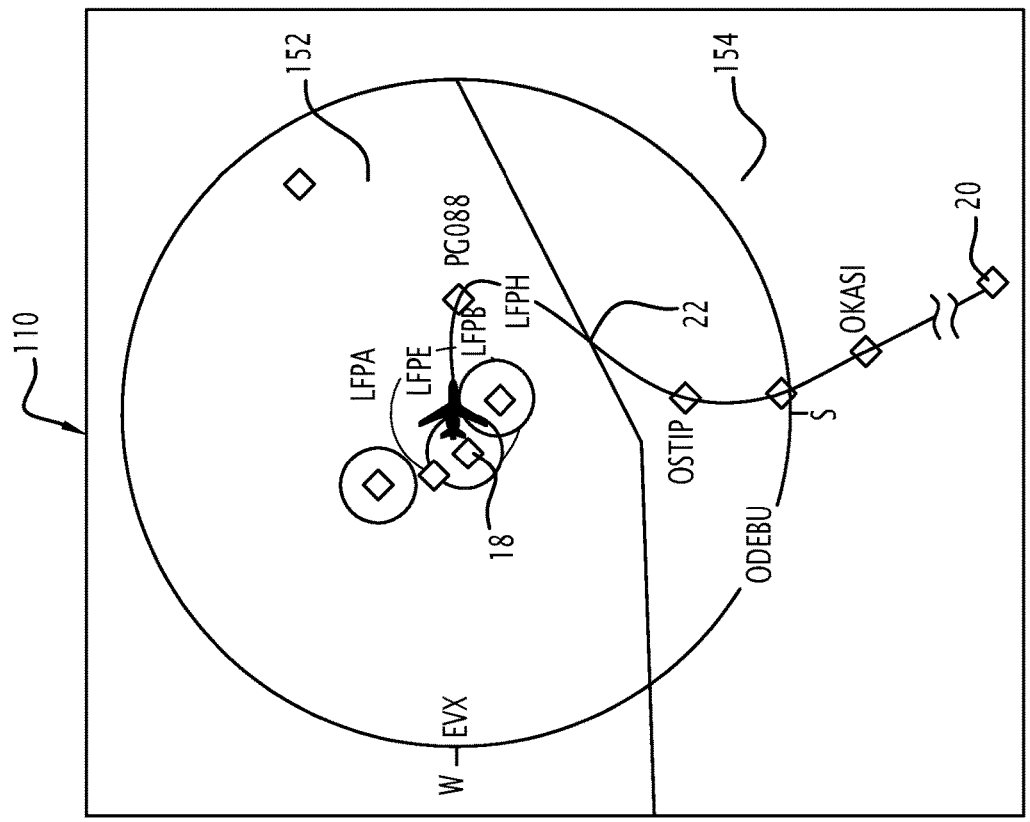
FIG. 6 is a view similar to FIG. 3, in which the user modifies another choice of operational mission specifications.
Figure 6:
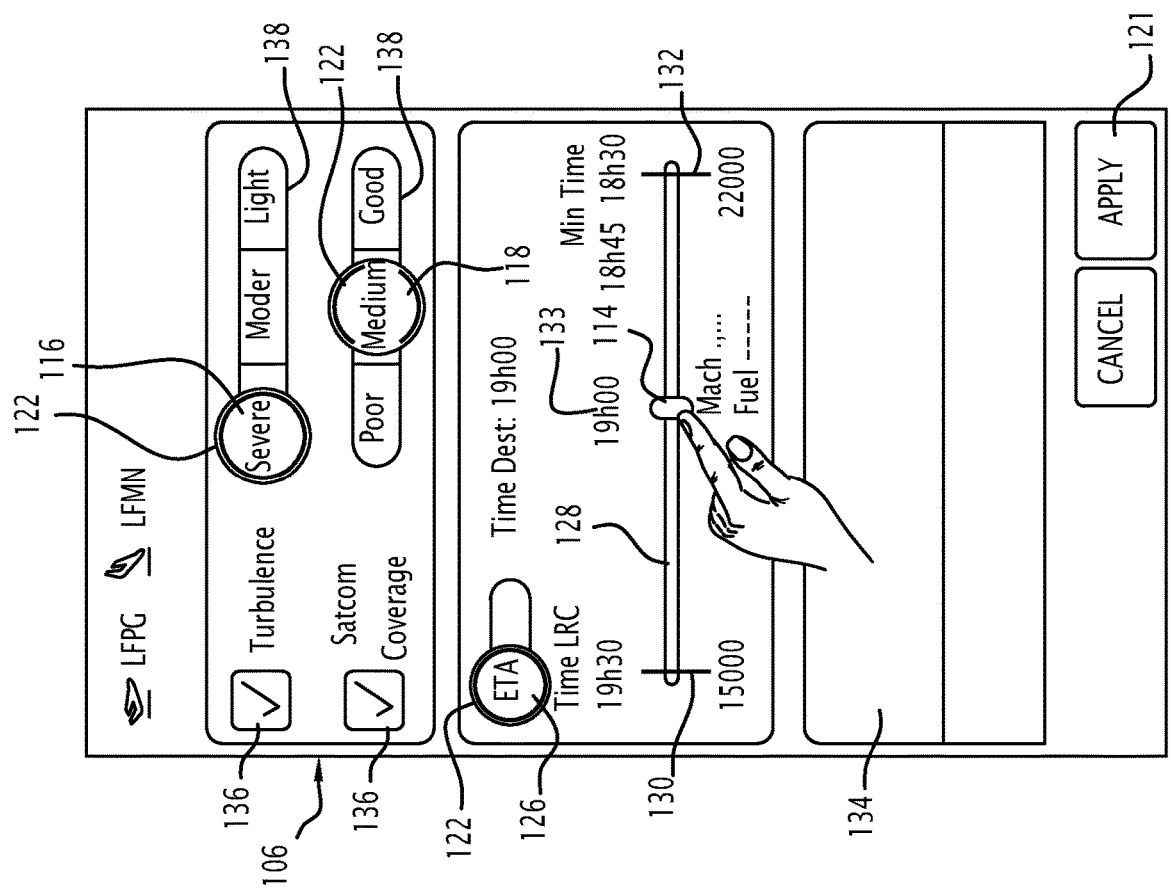

In reference to FIGS. 3 to 5, a first outcome indicator 122 is present on each definition button 114, 116, 118 and/or on a selection button 126.

The first outcome indicator 122 is an indicator specific to the operational specification that can be defined by each button 114, 116, 118. It provides information on the feasibility of the mission by indicating whether the current choice of the operational specification defined by the respective button 114, 116, 118 can be respected.

For example, the outcome indicator 122 is able to switch between a first display configuration, in which it indicates the feasibility of the mission while respecting the choice of the operational specification, and a second display configuration, in which it indicates the non-feasibility of the mission while respecting the choice of the operational specification. It optionally has a third display configuration corresponding to an alternative operational specification selection proposal that may lead to a feasibility of the mission.

In the example shown in FIGS. 3 to 7, the outcome indicator 122 is implemented by a color change of the respective button 116, 118, 126, the first configuration being marked by a first color (symbolized by a bold line in the figures), for example a green color, the second configuration being marked by a second color (symbolized by a dotted line in the figures), for example an amber color, and the third configuration by a third color (symbolized by shading in the figures), for example a blue color.

A second outcome indicator 124 is displayed in a outcome box 134 of a mission profile.

In a first example, the mission profile is symbolized by a progress bar 140 of the mission, for example illustrating the temporal or spatial progress of at least one leg of the mission.

The outcome indicator 124 is for example an overall outcome indicator that modifies the configuration of the bar 140 as a whole, between the first configuration in which it indicates the feasibility of the mission while complying with all of the choices of operational specifications for the mission, and the second configuration in which it indicates the non-feasibility of the mission while respecting all of the choices of operational specifications of the mission.

In the example shown in FIG. 2, in the second configuration, the outcome indicator 124 is able to identify, on the progress bar for the mission 140, the or each segment 142 of the mission in which the choice of the or each mission operational specification is impossible to respect.

For example, in the first configuration, the progress bar of the mission 140 is colored in a first color, in particular green.

In the second configuration, the progress bar of the mission 140 and/or each segment 142 is colored in a second color, in particular amber or red (shown in dotted lines in FIG. 4).

The activation button 120 is able to be shown in the window 106 when at least one outcome indicator 122, 124 is in its second configuration in which it indicates the non-feasibility of the mission.

The activation button 120 is able to be activated by the user to launch the computing engine 40 in order to obtain an alternative path in which at least one choice of operational specification is not respected.

The button for applying a path 121 is able to be activated by the user to send the obtained path and/or flight plan parameters to the flight management system 14.

After activating the path activation button 121, the display generating assembly is further able to display a route data transmission interface 150 to air traffic control, visible in FIG. 7.

The display management assembly 45 is able to display the path window 110 on the display 44 simultaneously with the definition and outcome window 106.

The path window 110 is able to illustrate, in two dimensions in a horizontal plane, a projection on the path in progress defined in the computing engine 40 on the horizontal plane. It is able to indicate the free flight zones 152 and the constrained flight zones 154, in particular in imposed airways 26.

It is also able to display at least one alternative path determined by the computing engine 40 (not shown), in the case where no path respects the choices of operational specifications.

The display management assembly 45 is able to display the summary window 110 on the display 44 simultaneously with the definition and outcome window 106.

In reference to FIG. 8, the summary window 113 comprises bars 155 illustrating the successive legs of the mission and optionally operational specifications associated with each leg, in particular operating constraints.

A mission computing method, implemented using the system 10 according to an embodiment of the invention, will now be described.

This method is for example implemented during the preparation of the mission, to establish its feasibility, to prepare the mission more precisely in order to obtain a flight plan, or to account for a last-minute change in a mission that has already been prepared.

Alternatively, this method is implemented during monitoring of the mission, or to test change hypotheses of the mission, to optimize it, or to reconfigure it.

Initially, the user, in particular the crew, enters at least a portion of the operational specifications using the configuration interface 42. The user for example defines, for each step of the mission, the geographical point of origin 18, the geographical destination point 20, and optionally, a number of passengers to be transported.

Then, in reference to FIG. 3, the display generating assembly 45 displays, on the display 44, the definition and outcome window 106.

The user first chooses an operating constraint between the airspeed and the time of arrival using the selection button 126.

He then actuates the first definition button 114 on the scale 128 to select the corresponding choice of operational specification, here a value of the operating constraint. In the example illustrated by FIG. 3, the operating constraint is the airspeed, and the user chooses an associated Mach number, referring to the value indicator 133.

This being done, the user selects one and/or the other of the activation boxes 136 to define operational specifications corresponding to passenger comfort criteria.

This activation creates the activation of the computing engine 40. The initialization module 58 recovers the current choices of operational specifications defined in the window 106.

The initialization module 58 advantageously recovers other operational specifications from the management and monitoring system 16 of the aircraft.

This step initializes the operational specifications related to the mission context and the airplane context, for example the presence of failures or dispatches. This step also initializes the passenger comfort operational specifications, in particular in terms of connectivity and turbulence level.

Then, the weather data recovery module 60 queries the weather database 50 in particular to obtain the speeds and directions of the wind between the point of origin 18 and the destination point 20, at several flight levels.

The airplane performance determining module 62 is then activated. The application 66 for determining the weight and balance determines the weight of the aircraft and the center of gravity of the aircraft (Zero Fuel Weight and Zero Fuel Weight Center of Gravity), based on the empty weight of the aircraft, equipment on board the aircraft, passengers and/or freight on board, and their position in the aircraft.

On this basis, based on the weather data recovered by the recovery module 60, based on the airplane context recovered from the initialization module 58, and based on the desired airspeed, the computing module 64 determines a possible path including the route followed, the weight and the balance of the aircraft, the takeoff and landing target.

The display generating assembly then displays, in the path window 110, the projection of the path. It further displays, in the summary window 113, information on the various successive points of the path, for the different steps of the path.

Furthermore, the display generating assembly 45 displays, in the definition and outcome window 106, the outcome indicators 122, 124.

In a first case, the path respects the defined choices of operational specifications, namely severe turbulence, moderate satellite coverage, and the selected airspeed. Each indicator 122, 124 is displayed in its first display configuration, for example by displaying the buttons 116, 118, 126 in the first color corresponding to this configuration, for example a green color.

If the user wishes to modify an operational mission specification, for example a passenger comfort constraint, the user actuates a button 116, 118 to move it on the scale 138 and select another operational specification choice.

In the example illustrated in FIGS. 3 to 4, the user goes from a severe turbulence choice to a moderate turbulence choice by actuating the button 116.

After actuating the button 116, the computing engine 40 is reactivated to determine a new path respecting the new operational specifications choice.

In this example, no path respects all of the choices of operational specifications. In particular, the choice of turbulence operational specification cannot be respected.

As illustrated by FIG. 4, the outcome indicator 122 associated with the button 116 therefore enters its second display configuration. In this example, the color of the button changes to go from the first color to the second color.

Likewise, the outcome indicator 124 displays a mission progress bar 140 having at least one segment 142 displayed in the second display configuration, for example an amber color. An indicator 146 of the duration of noncompliance with the operational specifications is optionally displayed to signal the noncompliance duration, and optionally the start time of the noncompliance, and the end time of the noncompliance.

The activation button 120 is then displayed to propose to the user to change paths and obtain an alternative path.

The user then activates the button 120. The computing engine 40 defines an alternative path in which at least one choice of operational specifications is not respected. In the example illustrated by FIG. 5, the time of arrival is modified, as illustrated on the button 114. The modified parameter is displayed in the third configuration. The outcome indicator 122 corresponding to the button 116 is also displayed in the third configuration.

The alternative path 22A is displayed in the third configuration (in dotted lines in FIG. 5) in the window 110.

Likewise, the progress bar 137 is displayed, if several alternative path proposals are possible.

Optionally, if the user finds a path suitable, he presses the application button 121 to implement the path and send the information to the flight management system 14.

Alternatively, the user can cancel the path selection. He can return to the configuration of FIG. 6, and select other choices of operational specifications, for example a change of time of arrival, making it possible to obtain a path respecting these choices.

After selecting the path, in reference to FIG. 7, the window 150 for sending information to air traffic control is displayed, allowing the user, during the mission, to send new information to air traffic control.

In the case where the computing system 10 is used during a flight comprising several steps of a same mission, a failure of a system of the aircraft can lead to a leg of the mission becoming non-feasible due to operational specifications defined for that leg. In this case, as illustrated in FIG. 8, a outcome indicator 160 is displayed in the summary window 113 to illustrate the non-feasibility of the second leg of the mission. In this example, the outcome indicator 160 is a mask covering the depiction of the second leg of the mission and indicating that it is not feasible.

Furthermore, an overall indicator of the non-feasibility of the mission may be displayed in the form of a colored indicator.

The user can then choose to divert toward alternative terrain, again making it possible to perform the mission by respecting the selected operational specifications, and the operational specifications imposed by the failure.

Figure 9:
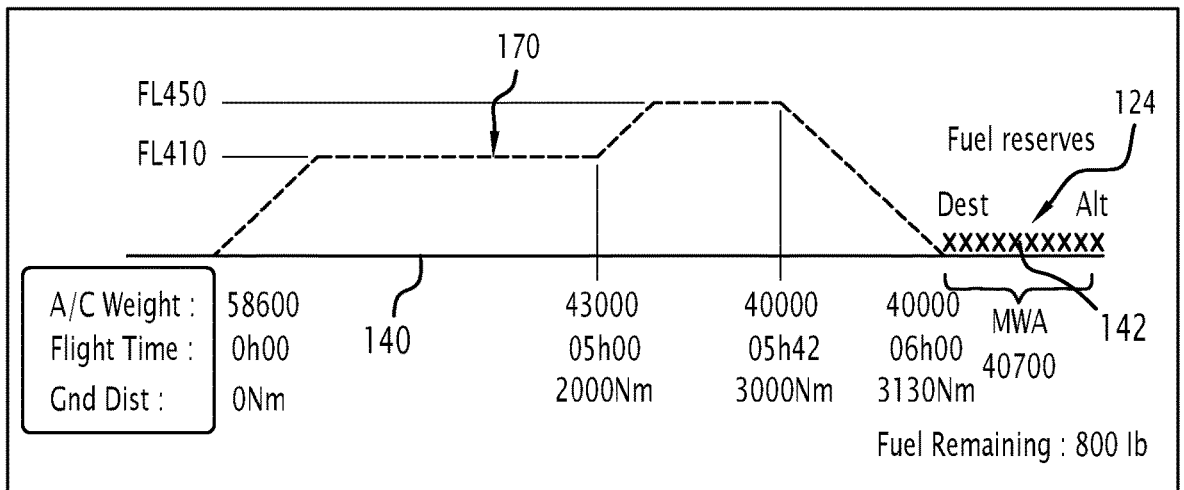
FIGS. 9 and 10 illustrate other particular feasibility outcome indicators of the mission, in the case of a mission that cannot be carried out, and in a case where the system proposes an alternative for carrying out the mission.
Figure 10:
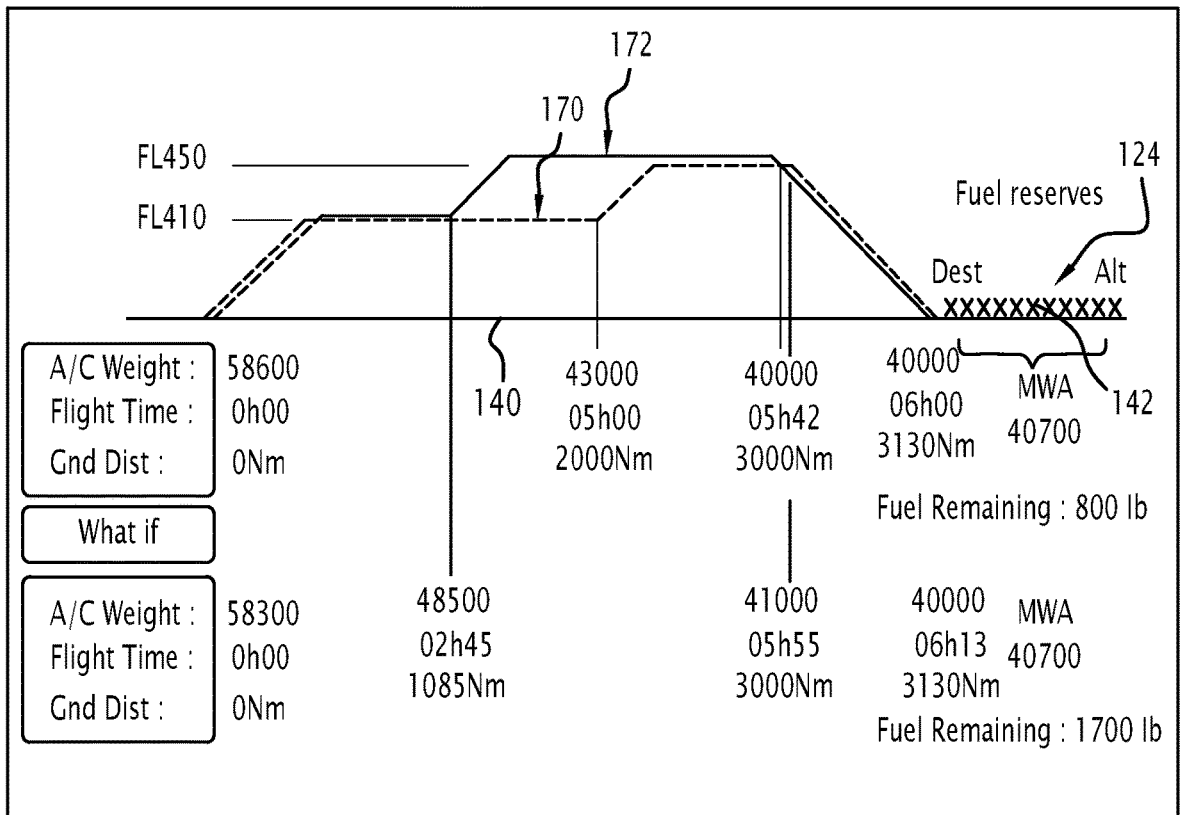

In an alternative illustrated by FIG. 9 and FIG. 10, the display management assembly 45 is capable of displaying a outcome box 134 comprising a vertical mission path profile 170, located above the mission progress bar 140. The outcome indicator 124 is formed by at least one segment 142 of the bar 140 or the profile 170 in which an operational mission specification, here a maximum distance, is not respected.

In FIG. 10, an alternative path is proposed and the alternative vertical profile 172 is displayed superimposed on the vertical profile 170 of the initial path to illustrate the modifications of the path.

Figure 11:
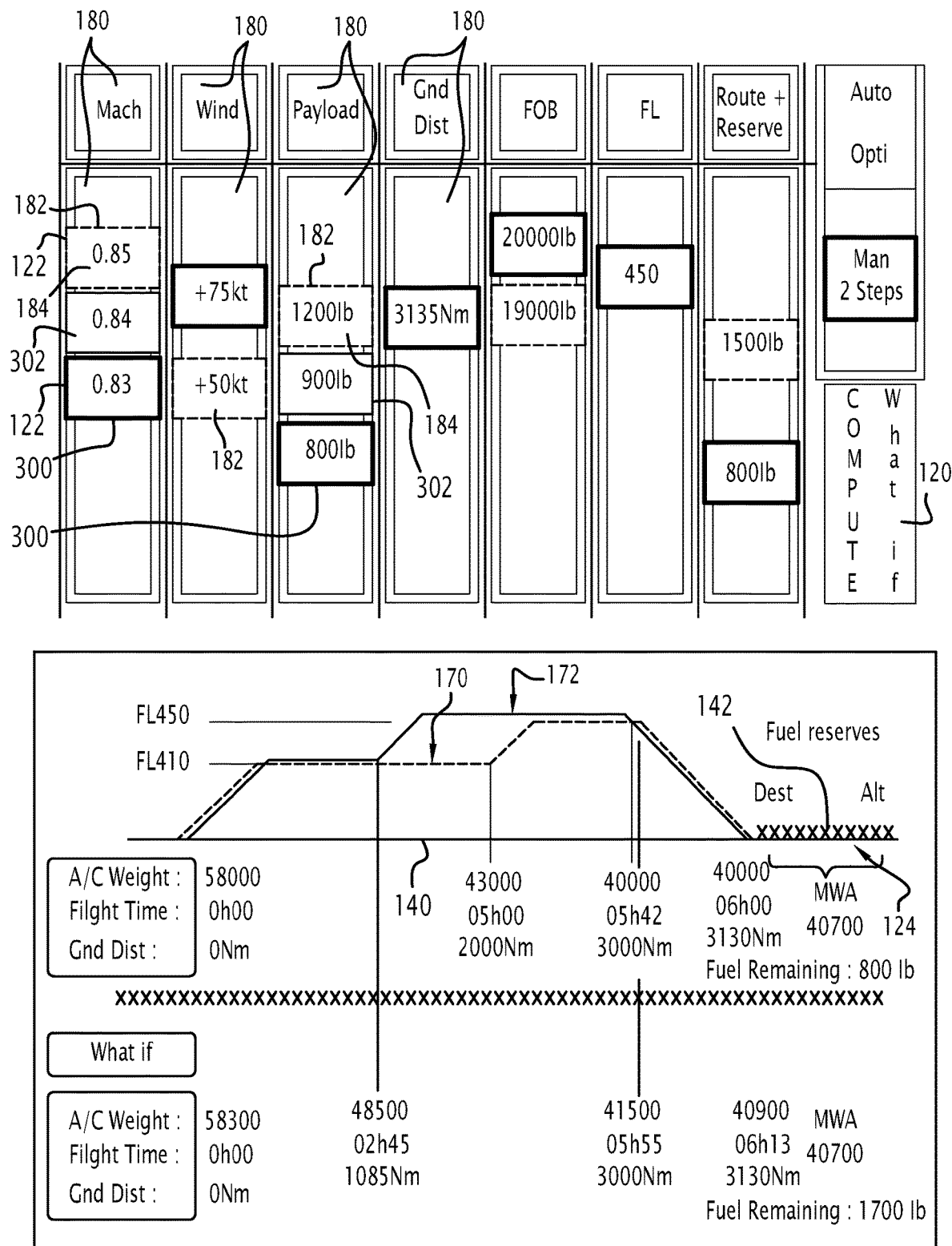
FIG. 11 illustrates the window displayed in an alternative computing system according to an embodiment of the invention.

An alternative definition and outcome window 106 is illustrated by FIG. 11. This window 106 is in particular intended to be used for mission preparation.

As illustrated in FIG. 11, the display generating assembly 45 is able to display a plurality of gauges 180 each corresponding to an operational mission specification for which a choice of operational specification must be made.

Each gauge 180 is provided with a definition button 182 on which an operational specification selection value 184 is indicated. A outcome indicator 122 is associated with each definition button 182, for example in the form of a colored contour of the definition button.

In this example, the gauges 180 for example correspond to an airspeed (defined by a "Mach"), a wind speed ("Wind"), a load of the aircraft ("Payload"), a maximum distance to be traveled ("Gnd Dist"), a fuel load ("FOB"), a flight level ("FL"), and a reserve fuel load ("Route+reserve").

An activation button 120 of the computing engine is arranged near the gauges 180. A outcome box 134 is displayed below the gauges 180.

To prepare the mission, the user actuates the various definition buttons 182 of the gauges 180 to choose a set of initial operational specification value selections. He then selects the activation button 120 of the computing engine 40.

The computing engine 40 recovers the values of the choices of operational specifications made using the definition buttons 182 and tries to determine a path respecting the choices of operational specifications.

If, like in FIG. 11, no path can be found with this set of values, the outcome indicator 120 of the or each definition button 182 for which an operational specification is not respected is displayed in its second configuration (buttons 182 with dotted lines in FIG. 11).

The computing engine 40 then determines whether, for each operational specification, a modified value of the operational specification exists making it possible to perform the mission by modifying just said operational specification.

For each gauge 180, a "phantom" button 300 is then displayed with the modified value, in the first configuration (here shown by a bold line).

The user can then select the button 182 again to determine an alternative path. An intermediate button 302 is displayed with the value selected by the user, in the third configuration (here shown by a thin continuous line).

The computing engine 40 can then be activated by the user via the button 120 to determine an alternative path.

The alternative path is displayed in the outcome box 134, as illustrated in FIG. 11. Furthermore, the or each choice of modified operational specification is embodied by an alternative position 184 of button 182 in each gauge 180.

When a path exists, the outcome indicators 122 around each definition button 180 are placed in their first configuration (illustrated by a bold continuous line). The outcome box 134 is then displayed with a mission progress bar 140 in the first configuration.

Figure 12:
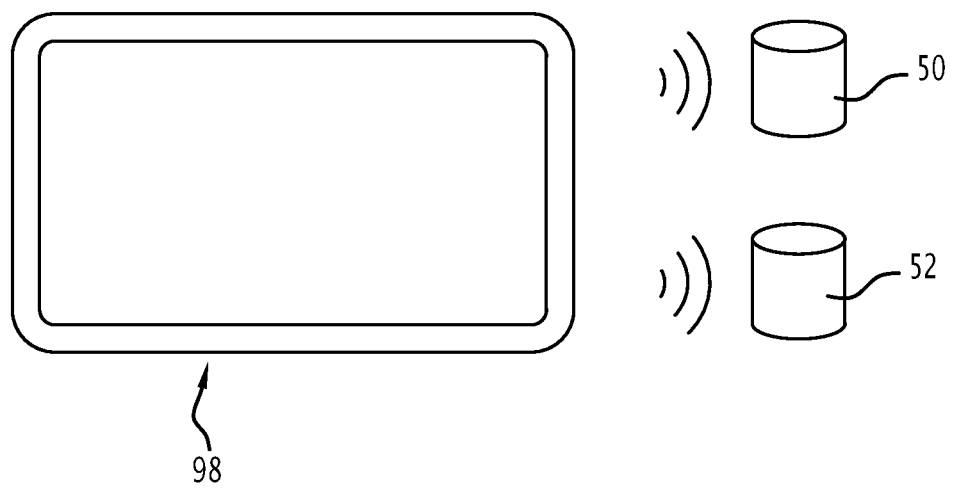
FIG. 12 is a schematic view illustrates another mission computing system according to an embodiment of the invention.

In the alternative illustrated in FIG. 12, the computing system of 10 is integrated within an electronic flight bag (EFB) for example assuming the form of a portable electronic device 98.

The portable electronic device is for example connected to the databases 50, 52 by a wireless datalink according to a wireless transmission protocol for example of the Wi-Fi type (for example according to Standard IEEE 802.11) or the Bluetooth type (for example according to Standard IEEE 802.15-1-2005).

What is claimed is:

1. An aircraft mission computing system, comprising:
a computing engine configured to compute paths of the aircraft during a mission, the computing engine being configured to compute a given path of the aircraft during the mission based on operational mission specifications,
a mission deck comprising a display and a display manager configured to display, on the display, at least one definition button for definition of at least one of the operational mission specifications, the at least one definition button being configured to be actuated by a user to define a choice of the at least one operational mission specification from among a plurality of choices for the at least one operational mission specification;
the computing engine being configured to be activated after defining the choice of the at least one operational mission specification using the at least one definition button to determine at least one possible path of the aircraft based on the choice of the at least one operational mission specification defined by the user using the at least one definition button;
the display manager being configured to display, on the display, after the activation of the computing engine, at least one outcome indicator providing feasibility information of the mission with the mission respecting the choice of the at least one operational mission specification defined by the user using the at least one definition button,
the at least one definition button being:
a definition button placed movably on a constraint selection scale allowing the user to define a choice of constraint value between a minimum value, taken at a first end of the scale and a maximum value, taken at a second end of the scale, based on the position of the button on the constraint selection scale; or/and a definition button placed movably on a constraint selection scale defining discrete constraint choices from among a set of possible constraints, based on the position on the constraint selection scale; and/or a plurality of definition buttons each provided on a respective one of a plurality of gauges, the display manager being configured to display the plurality of gauges, each gauge corresponding to an operational mission specification for which a choice of operational specification must be made;

the at least one outcome indicator being configured to present:

a first display configuration representative of a feasibility of the mission with the mission respecting the at least one operational mission specification defined by the user using the at least one definition button; and at least one second display configuration, representative of a non-feasibility of the mission with the mission respecting the at least one operational mission specification defined by the user using the at least one definition button.

2. The system according to claim 1, wherein at least one definition button is a plurality of respective definition buttons and the display manager is configured for simultaneously displaying, on the display, the plurality of respective definition buttons for defining a plurality of respective operational mission specifications, each of the definition buttons being configured to be actuated by a user to define an operational mission specification of the mission from among a plurality of choices for the respective operational mission specification.

3. The system according to claim 1, wherein at least one operational mission specification includes a mission context.

4. The system according to claim 3, wherein the mission context includes an operating constraint.

5. The system according to claim 4, wherein the operating constraint is a maximum takeoff weight, a navigation fuel load, a reserve fuel load, an imposed takeoff time and/or arrival time, a maximum distance to be traveled.

6. The system according to claim 3, wherein the mission context includes a navigation constraint.

7. The system according to claim 6, wherein the navigation constraint is a desired airspeed, a desired flight level, and/or an average wind.

8. The system according to claim 3, wherein the mission context includes a passenger comfort constraint.

9. The system according to claim 8, wherein the passenger comfort constraint is a desired turbulence level and/or a desired satellite coverage level.

10. The system according to claim 1, wherein the at least one outcome indicator is a specific indicator that is specific to a respective one of the operational mission specifications defined by the user using a given definition button of the at least one definition button, the specific indicator providing feasibility information on the mission with the mission respecting the choice of the respective operational mission specification defined by the user using the given definition button.

11. The system according to claim 10, wherein the display manager is configured to display the specific indicator on the given definition button.

12. The system according to claim 1, wherein the at least one outcome indicator is an overall mission feasibility indicator taking account of the choice of the at least one operational mission specification defined by the user using a respective definition button of the at least one definition button, the at least one outcome indicator providing overall feasibility information for the mission.

13. The system according to claim 12, wherein the display manager is configured to display at least one mission progress bar, the overall feasibility information being displayed on the at least one progress bar.

14. The system according to claim 13, wherein the overall feasibility information identifies, on the at least one progress bar, at least one segment of the mission in which the choice of the at least one operational mission specification is impossible to respect.

15. The system according to claim 1, wherein the display manager is configured to display, on the display, at least one activation button for activation of the computing engine by a user, the at least one activation button being configured to activate the computing engine in order to determine an alternative mission path not respecting the at least one operational mission specification defined using the at least one definition button.

16. The system according to claim 15, wherein the display manager is configured to display the at least one definition button in a position corresponding to an alternative choice of operational mission specification obtained by the computing engine for the alternative mission path.

17. The system according to claim 1, wherein the display manager is configured to display a button for applying the given path.

18. The system according to claim 1, wherein the display manager is configured to display an interface for sending information on the given path to an air traffic control facility.

19. An aircraft mission computing method, comprising:
displaying, on a display, at least one definition button for defining an operational mission specification of a mission of an aircraft, the at least one definition button being configured to be actuated by a user to define a choice of an operational mission specification of the mission from among a plurality of choices for the operational mission specification;

after defining the choice of the operational mission specification using the at least one definition button by the user, activating a computing engine to determine at least one possible path of the aircraft based on the choice of the operational mission specification defined by the user; and then displaying, on the display, at least one outcome indicator providing feasibility information of the mission with the mission respecting the choice of the operational mission specification defined by the user using the at least one definition button, the at least one definition button being:

a definition button placed movably on a constraint selection scale allowing the user to define a choice of constraint value between a minimum value, taken at a first end of the scale and a maximum value, taken at a second end of the scale, based on the position of the button on the constraint selection scale; or/and a definition button placed movably on a constraint selection scale defining discrete constraint choices from among a set of possible constraints, based on the position on the constraint selection scale; and/or a plurality of definition buttons each provided on a respective one of a plurality of gauges, each gauge corresponding to an operational mission specification for which a choice of operational specification must be made;

the at least one outcome indicator being configured to present:

a first display configuration representative of a feasibility of the mission with the mission respecting the at least one operational mission specification defined by the user using the at least one definition button; and
at least one second display configuration, representative of a non-feasibility of the mission with the mission respecting the at least one operational mission specification defined by the user using the at least one definition button.

* * * * *